(12) United States Patent
Arai

(10) Patent No.: US 9,885,984 B2
(45) Date of Patent: Feb. 6, 2018

(54) IMAGE FORMING APPARATUS, IMAGE FORMING METHOD AND COMPUTER READABLE MEDIUM

(71) Applicant: Konica Minolta, Inc., Tokyo (JP)

(72) Inventor: Hiroyuki Arai, Hachioji (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/283,871

(22) Filed: Oct. 3, 2016

(65) Prior Publication Data

US 2017/0102648 A1    Apr. 13, 2017

(30) Foreign Application Priority Data

Oct. 7, 2015 (JP) .................................. 2015-199034

(51) Int. Cl.
| | |
|---|---|
| G03G 15/00 | (2006.01) |
| G03G 15/20 | (2006.01) |
| G01J 3/52 | (2006.01) |
| G03G 15/01 | (2006.01) |

(52) U.S. Cl.
CPC ......... *G03G 15/2039* (2013.01); *G01J 3/524* (2013.01); *G03G 15/01* (2013.01); *G03G 15/0189* (2013.01); *G03G 15/5062* (2013.01); *G03G 15/55* (2013.01)

(58) Field of Classification Search
CPC ............ G03G 15/2039; G03G 15/205; G03G 15/2078; G03G 15/5062; G03G 15/5066; G03G 15/507; G01J 3/524
See application file for complete search history.

(56) References Cited

U.S. PATENT DOCUMENTS

| | | | |
|---|---|---|---|
| 2005/0071104 A1* | 3/2005 | Viturro | G01J 3/46 702/85 |
| 2010/0201061 A1* | 8/2010 | Zirilli | B41F 33/0036 271/225 |
| 2014/0126945 A1* | 5/2014 | Uchida | G03G 21/1633 399/406 |

FOREIGN PATENT DOCUMENTS

| | | | |
|---|---|---|---|
| JP | H10-114454 A | 5/1998 | |
| JP | 2005-062273 A | 3/2005 | |
| JP | 2005-292374 A | 10/2005 | |
| JP | 2006-308888 A | 11/2006 | |
| JP | 2010-164935 A | 7/2010 | |

(Continued)

OTHER PUBLICATIONS

Japan Patent Application No. 2015-199034; Notice of Reasons for Rejection; dated Aug. 29, 2017; 17 pages.

(Continued)

*Primary Examiner* — Carla Therrien
(74) *Attorney, Agent, or Firm* — Baker & Hostetler LLP

(57) ABSTRACT

An image forming apparatus includes a sheet feeder, a sheet conveyor, an image former, a fixer, a colorimeter and a processor. The fixer fixes an image formed on a sheet by the image former. The colorimeter is provided on a down-stream side than the fixer in a sheet conveying direction and reads the image. The processor calibrates the colorimeter based on the image read by the colorimeter. When an image for calibration which is formed in advance on a color sample housed in the sheet feeder is made to be read by the colorimeter, the processor controls at least one of the sheet conveyor, the image former and the fixer according to a condition for controlling deterioration of the color sample which is different from a condition of when carrying out an image forming.

12 Claims, 5 Drawing Sheets

(56) References Cited

FOREIGN PATENT DOCUMENTS

| | | |
|---|---|---|
| JP | 2014-095741 A | 5/2014 |
| JP | 2014-170195 A | 9/2014 |

OTHER PUBLICATIONS

Japan Patent Application No. 2015-199034; Decision of Refusal; dated Nov. 14, 2017; 3 pages.

\* cited by examiner

FIG.5

IMAGE FORMING APPARATUS, IMAGE FORMING METHOD AND COMPUTER READABLE MEDIUM

CROSS-REFERENCE TO RELATED APPLICATIONS

This U.S. patent application is entitled to and claims the benefit of Japanese patent application No. 2015-199034, filed on Oct. 7, 2015, the entire contents of which are incorporated herein by reference in its entirety.

BACKGROUND OF THE INVENTION

Field of the Invention

The present invention relates to an image forming apparatus, an image forming method and a computer readable medium.

Description of Related Art

Traditionally, there has been image forming apparatuses which form a pattern image for colourimetry on a sheet, change the image forming condition and the like in accordance with the read value obtained by a colorimeter (colourimetry unit) provided in the apparatus reading the pattern image and carry out color adjustment of the apparatus (for example, see JP 2014-170195).

In the traditional image forming apparatus, the colorimeter provided in the apparatus is a simple version and its reading accuracy is low. Therefore, in the case where the absolute density of an image is to be adjusted, the pattern image is to be read by a colorimeter of high reading accuracy which is provided outside of the apparatus. The colorimeter which is provided outside of the apparatus can adjust the absolute density by reading the color sample which is printed in advance by an exclusive printing apparatus which can perform high definition printing, the absolute density being guaranteed in the color sample.

Traditionally, calibration of the colorimeter provided in an apparatus has not been carried out. In order to calibrate the colorimeter provided in an apparatus, a color sample which guarantees the absolute density needs to be read by the colorimeter. However, since a traditional image forming apparatus cannot form a color sample which guarantees the absolute density on a sheet, a color sample which guarantees the absolute density cannot be read by the colorimeter provided in the apparatus in a normal reading operation.

In view of the above, there is a method where a color sample which guarantees the absolute density is housed in a sheet feeding tray of an image forming apparatus. The color sample which guarantees the absolute density is passed through the colorimeter to make the colorimeter read the color sample. By using the above method, the absolute density in the colorimeter is calibrated without requiring a mechanism exclusively for the calibration.

However, in the method where the color sample is housed in a sheet feeding tray of the image forming apparatus and passed through the colorimeter, the color sample passes through the conveying path which is used for the image forming process in the image forming apparatus. Therefore, the surface condition of the color sample may change due to wax and the like attaching thereto when passing though the fixer. There is a problem that this can cause a negative influence on the calibration.

Further, in the case where the color sample is conveyed according to a normal image forming process, the color sample may be deteriorated due to the conveying operation which is similar to that of when carrying out the image forming, and there is a problem that the color sample cannot be reused repeatedly.

SUMMARY OF THE INVENTION

The present invention is made in view of the above problems, and an object of the present invention is to provide an image forming apparatus, an image forming method thereof and a computer readable medium in which a colorimeter is calibrated by using a color sample without requiring a special mechanism and without having a negative influence on the calibration and by reusing the color sample repeatedly.

In order to realize the above object, according to one aspect of the present invention, there is provided an image forming apparatus, including:
  a sheet feeder which houses and feeds a sheet;
  a sheet conveyor which conveys the sheet fed from the sheet feeder;
  an image former which forms an image on the sheet;
  a fixer which fixes the image formed on the sheet by the image former;
  a colorimeter which is provided on a down-stream side than the fixer in a sheet conveying direction and which reads the image formed on the sheet; and
  a processor which calibrates the colorimeter based on the image read by the colorimeter, the processor controlling at least one of the sheet conveyor, the image former and the fixer according to a condition for controlling deterioration of a color sample housed in the sheet feeder when an image for calibration which is formed in advance on the color sample housed in the sheet feeder is made to be read by the colorimeter, the condition being different from a condition of when carrying out an image forming.

Preferably, when the processor makes the sheet conveyor convey the color sample, the processor determines whether a setting temperature of the fixer is lower or equal to a predetermined temperature which is lower than a temperature of when carrying out the image forming, and
  when the processor determines that the setting temperature of the fixer is lower or equal to the predetermined temperature, the processor makes the color sample pass through the fixer.

Preferably, when the processor makes the sheet conveyor convey the color sample, the processor makes a pair of rollers of the fixer separate from each other and makes the color sample pass through the pair of rollers.

Preferably, the processor determines whether a sheet length of the color sample in the sheet conveyance direction is longer or equal to a predetermined sheet length, and
  when the processor determines that the sheet length of the color sample is longer or equal to the predetermined sheet length, the processor makes the sheet conveyor convey the color sample.

Preferably, the image forming apparatus further includes:
  a flattener which is disposed between the fixer and the colorimeter and which corrects deformation of the sheet, and
  when the color sample is conveyed by the sheet conveyor, the processor makes the color sample pass through the flattener after turning the flattener off.

Preferably, the image forming apparatus further includes:
  a detour path which avoids the fixer, and when the color sample is conveyed by the sheet conveyor, the processor makes the color sample be conveyed on the detour path which avoids the fixer.

Preferably, the image forming apparatus further includes: a PI tray, and when the color sample is selected as a paper type of sheets housed in a sheet feeding tray of the sheet feeder, the processor makes a display display a warning to use the PI tray.

Preferably, when the color sample is set as a paper type of sheets housed in a sheet feeding tray of the sheet feeder, the processor stops receiving an image forming job and only carries out a passing operation of the color sample.

Preferably, when the color sample is set as a paper type of sheets housed in a sheet feeding tray of the sheet feeder, the processor controls a setting temperature of the fixer so as to be lower or equal to a predetermined temperature which is lower than a temperature of when carrying out the image forming.

Preferably, when the color sample is conveyed by the sheet conveyor, the processor makes the color sample be conveyed at a speed faster than or equal to a fastest conveying speed available in the image forming.

Preferably, the processor automatically cancels a setting that a paper type of sheets housed in a sheet feeding tray of the sheet feeder is the color sample after the colorimeter is calibrated based on the image for calibration which is read by the colorimeter.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 5 shows an example of a sheet setting window.

DESCRIPTION OF THE PREFERRED EMBODIMENTS

Hereinafter, an embodiment of the present invention will be described with reference to the drawings. Though various technical limitations which are preferable to perform the present invention are included in the after-mentioned embodiment, the scope of the invention is not limited to the following embodiment and the illustrated examples.

Figure 1:
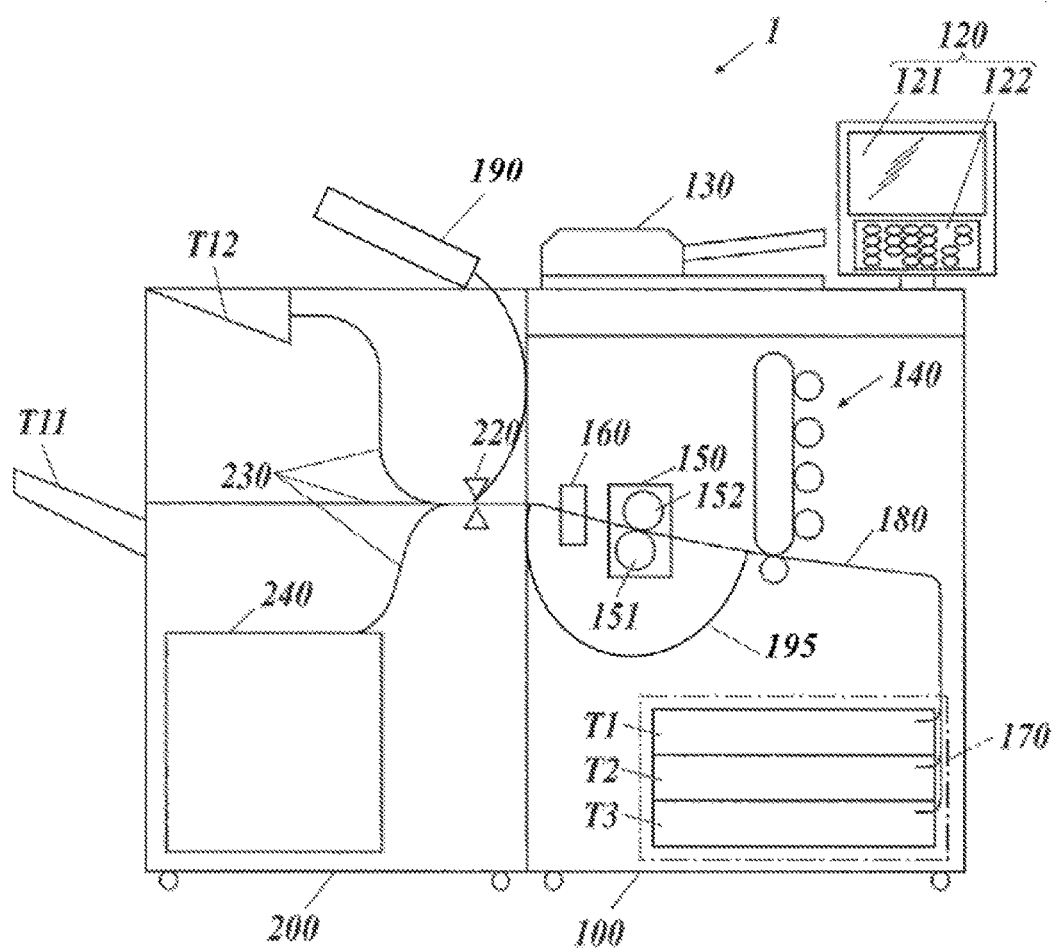
FIG. 1 is a schematic configuration of an image forming system according to an embodiment.

As shown in FIG. 1, the image forming system (image forming apparatus) 1 according to the embodiment is a system where an image forming apparatus main body 100 and a finish apparatus 200 are connected in series.

The image forming apparatus main body 100 is an image forming apparatus which forms a color image by the electrophotographic method on the basis of image data obtained by reading an image from a document or image data received from an external device.

Figure 2:
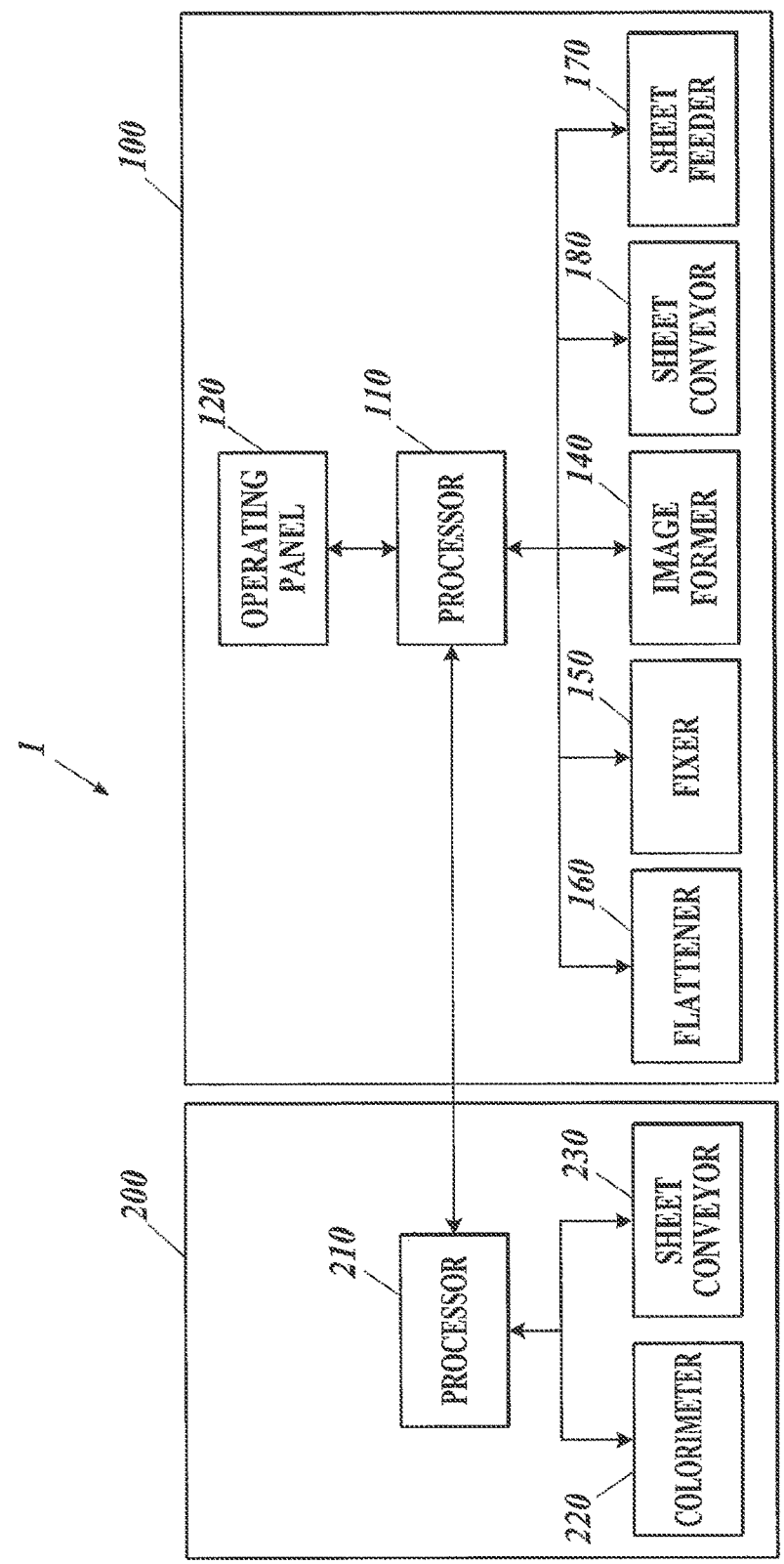
FIG. 2 is a block diagram showing a functional configuration of the image forming system according to the embodiment.

As shown in FIGS. 1 and 2, the image forming apparatus main body 100 includes a processor 110, an operating panel 120, a document reading unit 130, an image former 140, a fixer 150, a flattener 160, a sheet feeder 170 and a sheet conveyor 180. The individual units are connected to each other by a bus.

The processor 110 is configured by including a CPU, a ROM, a RAM and the like. The CPU of the processor 110 reads out the system program and various types of processing programs which are stored in the ROM, opens the programs in the RAM and controls the operation of units of the image forming apparatus main body 100 in accordance with the opened programs in an integrated manner.

The operating panel 120 is configured by including a display 121 and an operating unit 122.

The display 121 is configured by including a LCD (Liquid Crystal Display) and the like. In the display 121, various types of operation buttons, device conditions, operation condition of each function and the like are displayed in the display screen in accordance with the instructions of the display signals which are input from the processor 110.

The operating unit 122 includes various types of keys such as a numeric key pad, a start key and the like. The operating unit 122 receives key operations performed by a user and outputs operation signals relating to the operations to the processor 110. The operating unit 122 further includes a pressure sensitive type (resistive film pressure type) touch panel where transparent electrodes are arranged in a lattice pattern so as to cover the upper surface of the LCD of the display 121. The operating unit 122 detects the XY coordinates of a point where pressed by a finger, a touch pen or the like in terms of a voltage value and outputs the detected position signal to the processor 110 as the operating signal. The touch panel is not limited to the pressure sensitive type and can be another type, such as an electrostatic type or an optical type.

The document reading unit 130 includes a light source, a CCD (Charge Coupled Device) image sensor, an A/D converter and the like. The document reading unit 130 reads an image of a document by forming an image with the reflection light of the light from the light source which lit and scanned the document and by performing photoelectric conversion. The document reading unit 130 performs an A/D conversion on the read image and outputs the obtained image data to the image former 140.

The image former 140 carries out image forming on a recording medium such as a recording sheet which is fed from the sheet feeder 170 on the basis of image data which is input from the document reading unit 130. As for the image forming method of the image former 140, any known method such as the electrophotographic method, the inkjet method, the thermal transfer method and the like can be used.

The fixer 150 is configured by including a heating and conveying roller 151 which is disposed on the lower surface side of a sheet and a fixing roller 152 which is disposed on the upper surface side on a sheet. The heating and conveying roller 151 and the fixing roller 152 function as a pair of rollers of the present invention. In the fixer 150, a sheet is passed through the nip formed by the heating and conveying roller 151 and the fixing roller 152, the rollers being heated and pressed against each other, to be heated and pressed so as to fix the transferred toner image on the sheet and to convey the sheet to the down-stream side in the conveyance direction.

The heating and conveying roller 151 can press against or separate from the fixing roller 152. During the idling state, the heating and conveying roller 151 is separated from the fixing roller 152.

The flattener 160 corrects deformation of the sheet to which the fixing process is carried out and flattens the sheet. Sheets are easily deformed by the fixing process and there is a need to flatten the sheets when the colorimeter 220 reads the images on the sheets. Therefore, as shown in FIG. 1, the flattener 160 is disposed between the fixer 150 and the colorimeter 220 of the finish apparatus 200 in the sheet conveyance direction.

The sheet feeder 170 includes sheet feeding trays T1 to T3 and feeds sheets to the sheet conveyor 180. In each of the sheet feeding trays T1 to T3, sheets of predetermined type and size are housed.

The sheet conveyor 180 controls the conveying roller for conveying a sheet to feed the sheets to the image former 140 and the fixer 150, the sheets having been fed from the sheet feeder 170. After the flattener 160 flattens the sheets on which images are formed and fixed, the sheet conveyor 180 outputs the sheets to the finish apparatus 200.

The finish apparatus 200 outputs the sheets on which images are formed by the image former 140 to the sheet output trays T11 and T12 or stacks the sheets on a large capacity stacker 240.

The finish apparatus 200 includes a processor 210, a colorimeter 220 and a sheet conveyor 230. The individual units of the finish apparatus 200 are connected to each other by a bus.

The processor 210 is configured by including a CPU, a ROM, a RAM and the like. The CPU of the processor 210 reads out the system program and various types of processing programs which are stored in the ROM, opens the programs in the RAM and controls the operation of the individual units of the finish apparatus 200 in accordance with the opened programs in an integrated manner.

The colorimeter 220 reads images on sheets to which image forming is carried out by the image former 140 and a sheet (color sample) on which the image for calibration is printed in advance and outputs the read data (image data) to the processor 110 of the image forming apparatus main body 100. The colorimeter 220 is a color sensor which receives a light with a light receiving element, the light being emitted from the light source and reflected on the surface of a sheet, and which outputs a signal according to the light intensity. The colorimeter 220 can be configured by including a line sensor in which a plurality of light receiving elements are arranged in the direction orthogonal to the sheet conveyance direction with predetermined spaces therebetween or can be a sensor which only reads a predetermined region in the direction orthogonal to the sheet conveyance direction.

When an image formed on a sheet by the image former 140 is read by the colorimeter 220, for example, the processor 110 checks the color and the position of the image, a smear on the image and the like.

When the image on the sheet (color sample) on which the image for calibration is printed in advance is read by the colorimeter 220, the processor 110 calibrates the output value of the colorimeter 220 on the basis of the image for calibration which is read. The image for calibration includes patches of various colors, color tone pattern and the like.

When the color sample is read by the colorimeter 220, the processor 110 controls at least one of the sheet conveyors 180 and 230, the image former 140 and the fixer 150 according to the condition for controlling the deterioration of the color sample which is different from the condition of when carrying out the image forming.

The condition for controlling the deterioration of the color sample is the condition for controlling the deterioration of the image of the color sample and the deterioration of the color sample itself.

The sheet conveyor 230 controls the conveying roller for conveying a sheet so as to make the colorimeter 220 read the image formed on the sheet, and then conveys the sheet to the sheet output trays T11 and T12 or to the large capacity stacker 240.

Next, the operation of the image forming system 1 (image forming apparatus main body 100) according to the embodiment will be described with reference to FIGS. 3 to 5.

Figure 3:
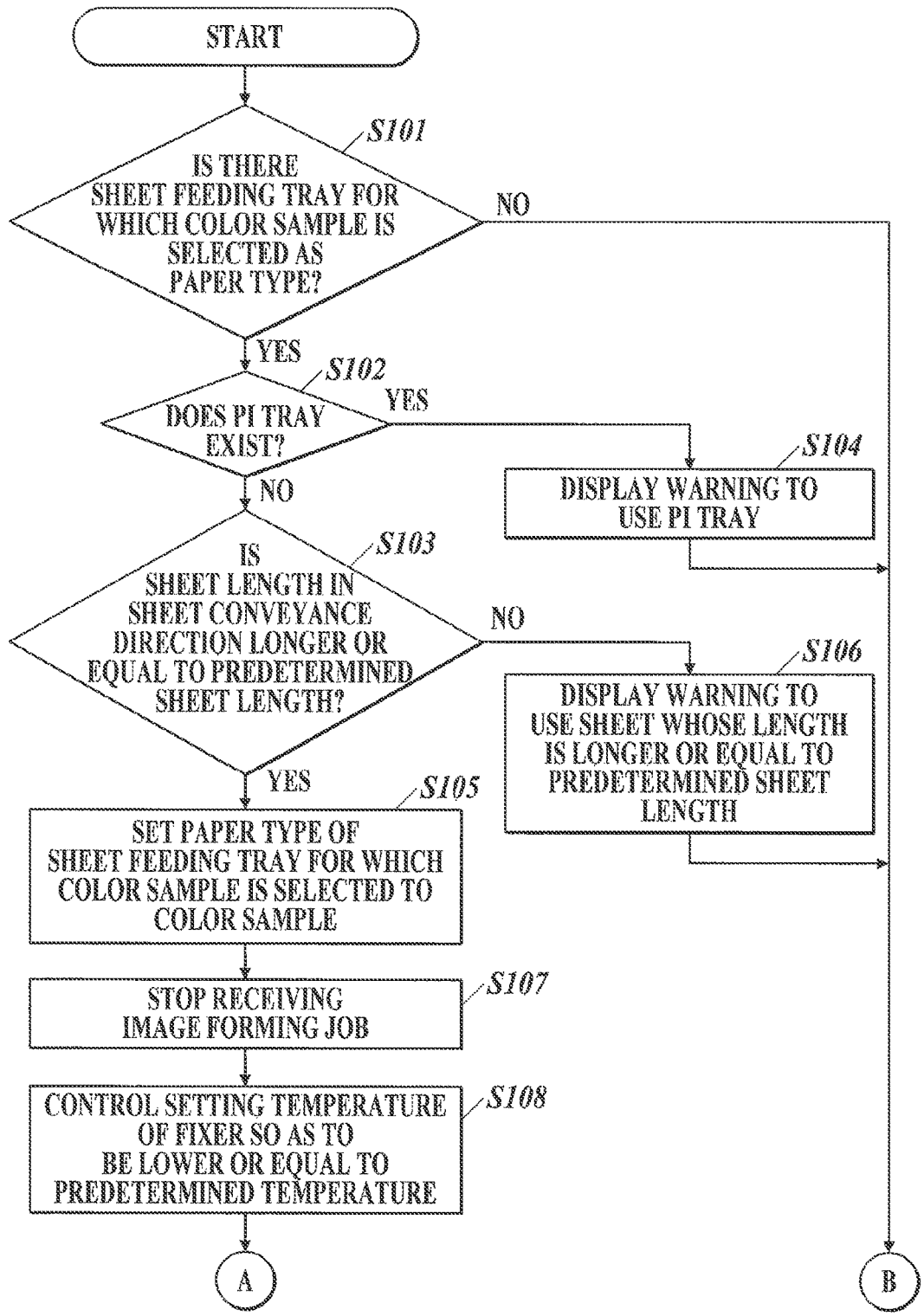
FIG. 3 is a flowchart showing an operation of the image forming system according to the embodiment.
Figure 4:
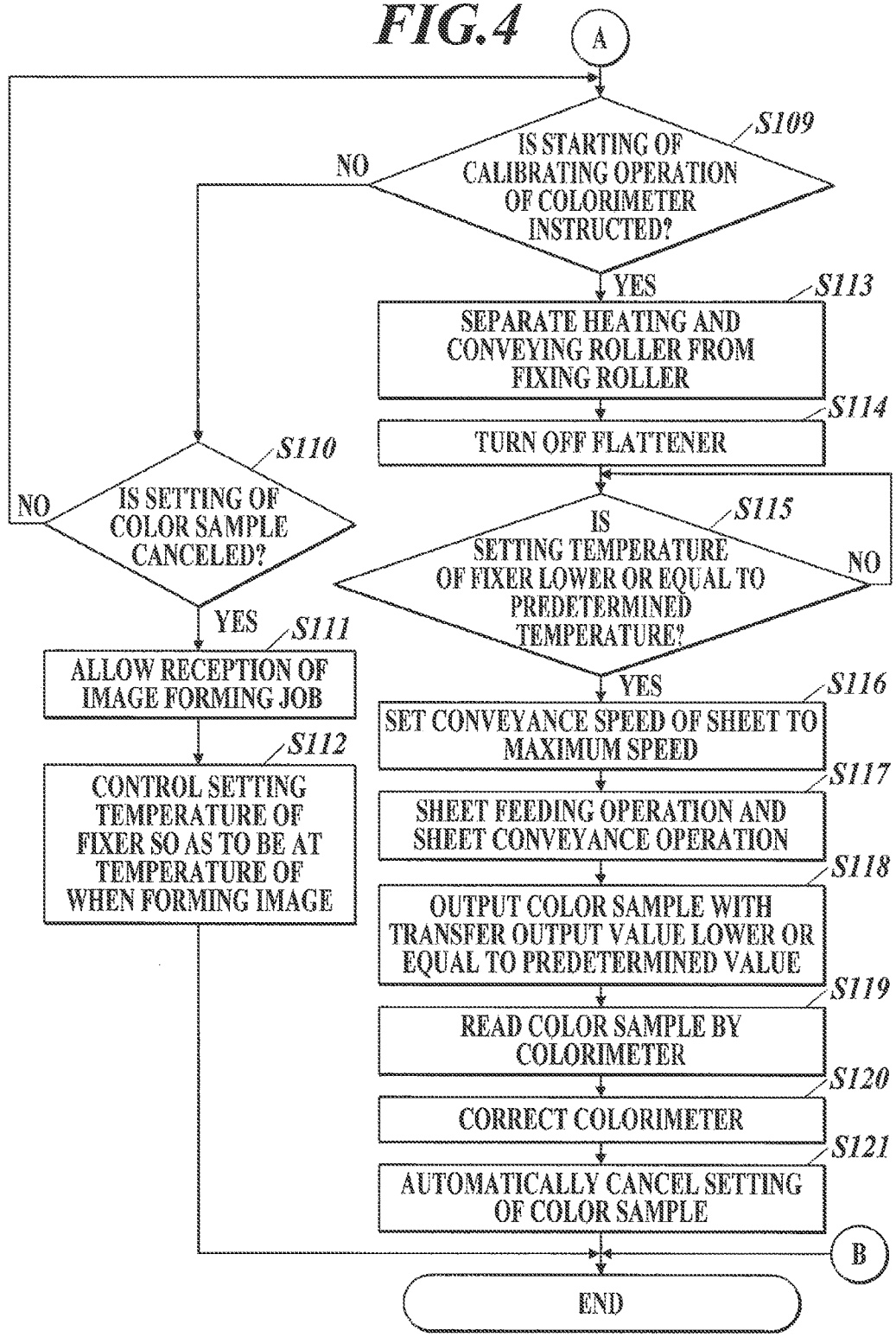
FIG. 4 is the flowchart showing the operation of the image forming system according to the embodiment.

First, as shown in FIGS. 3 and 4, the processor 110 of the image forming apparatus main body 100 determines whether there is a sheet feeding tray, among the sheet feeding trays T1 to T3 of the sheet feeder 170, for which the color sample is selected as the paper type of the sheets housed therein (Step S101). In particular, when a predetermined setting operation is carried out in the sheet setting window G1 shown in FIG. 5, the processor 110 determines that there is a sheet feeding tray, among the sheet feeding trays T1 to T3, for which the color sample is selected.

Figure 5:
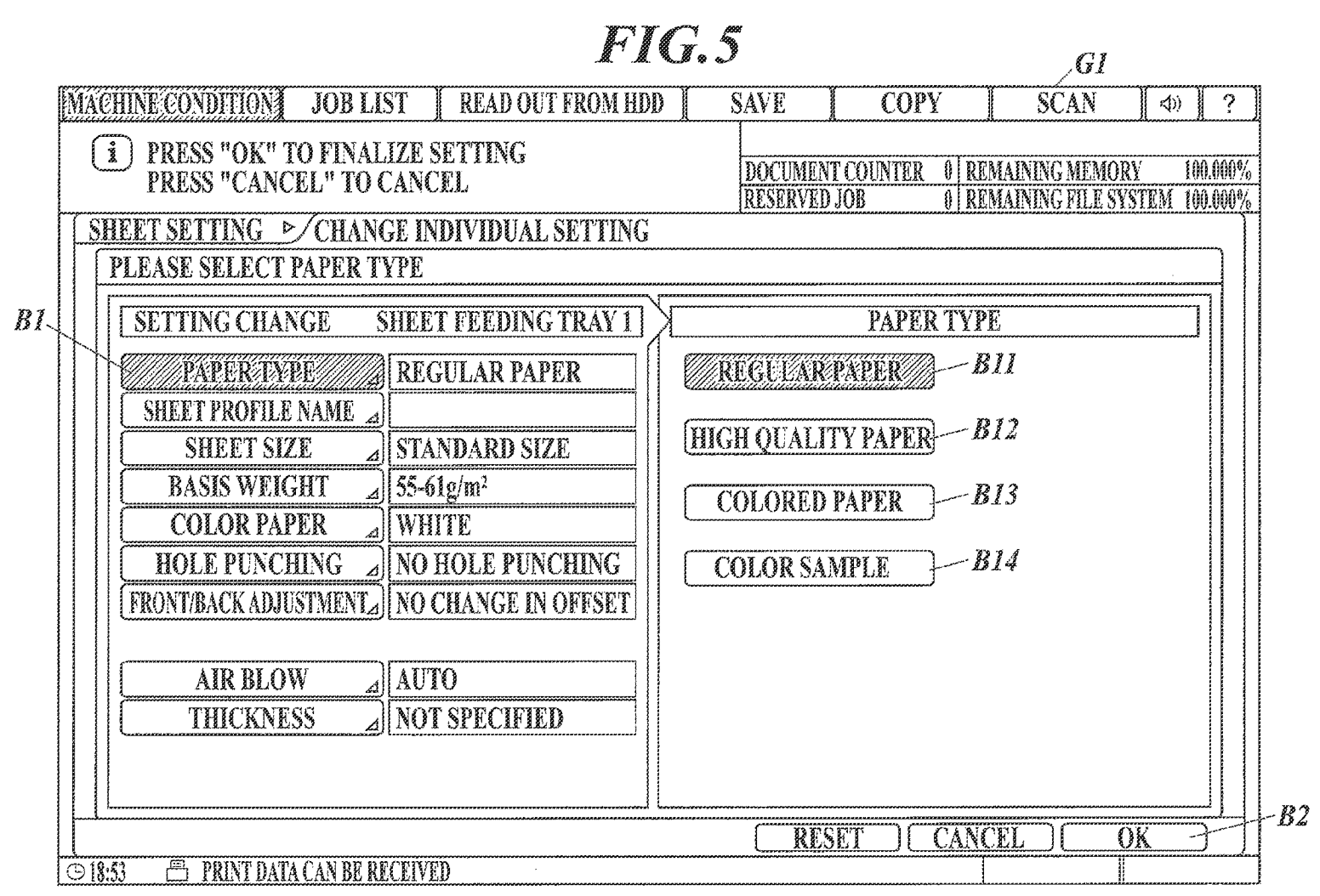

As shown in FIG. 5, the sheet setting window G1 is a window for setting the attribution of the sheets housed in any of the sheet feeding trays T1 to T3 which is specified as the setting target. In the example shown in FIG. 5, the paper type button B1 for setting the paper type of the sheets housed in the "sheet feeding tray T1" is selected. The regular paper button B11, high quality paper button B12, colored paper button B13 and color sample button B14 are displayed as the paper type candidates. When the color sample button B14 is selected by a user and the OK button B2 is pressed in this state in the sheet setting window G1, the processor 110 associates the "sheet feeding tray T1" with the information indicating that the paper type is "color sample" and determines that there is a sheet feeding tray, among the sheet conveyance trays T1 to T3, for which the color sample is selected.

When the processor 110 determines that there is a sheet feeding tray, among the sheet feeding trays T1 to T3, for which the color sample is selected (Step S101: YES), the processor 110 proceeds to Step S102.

On the other hand, when the processor 110 determines that there is no sheet feeding tray, among the sheet feeding trays T1 to T3, for which the color sample is selected (Step S101: NO), the processor 110 ends the process.

Next, the processor 110 determines whether the PI tray exists (Step S102). The PI tray 190 is a tray for insert sheets which is provided in the finish apparatus 200. The sheets housed in the PI tray are directly fed to finish units of the finish apparatus 200 without passing through the image forming apparatus main body 100. In the embodiment, since the PI tray is not provided in the finish apparatus 200, it is determined that the PI tray does not exist. In the case where the PI tray is provided in the finish apparatus 200, it is determined that the PI tray exists.

When the processor 110 determines that the PI tray exists (Step S102: YES), the processor 110 makes the display 121 of the operating panel 120 display a warning to use the PI tray (Step S104) and ends the process.

On the other hand, when the processor 110 determines that the PI tray does not exist (Step S102: NO), the processor 110 proceeds to Step S103.

Next, the processor 110 determines whether the sheet length of the color sample in the sheet conveyance direction is longer or equal to a predetermined sheet length (Step S103). The predetermined sheet length is the sheet length which allows the sheet to be in contact with the conveying roller in front of the fixer 150 as well as the conveying roller behind the fixer 150 so that the sheet can be conveyed even in the state where the heating and conveying roller 151 of the fixer 150 is separated from the fixing roller 152 of the fixer 150 (that is, the length between the conveying roller in front of the fixer 150 and the conveying roller behind the fixer 150). For example, the predetermined sheet length is 250 mm.

When the processor 110 determines that the sheet length of the color sample is longer or equal to the predetermined sheet length (Step S103: YES), the processor 110 proceeds to Step S105.

On the other hand, when the processor 110 determines that the sheet length of the color sample is shorter than the predetermined sheet length (Step S103: NO), the processor 110 makes the display 121 display a warning to use a sheet whose sheet length is longer or equal to the predetermined sheet length (Step S106) and ends the process.

Next, the processor 110 sets the paper type of the sheet feeding tray, among the sheet feeding trays T1 to T3, for which the color sample is selected as the paper type of sheets housed therein to the color sample (Step S105). That is, the processor 110 finalizes the paper type of the sheet feeding tray, among the sheet feeding trays T1 to T3, for which the color sample button B14 is pressed in the sheet setting window G1 to the color sample.

Next, the processor 110 stops receiving image forming jobs (Step S107). In such way, the image forming operation and the sheet passing operation in association with the image forming operation are stopped and only the sheet passing operation of the color sample is to be carried out.

Next, the processor 110 controls the setting temperature of the fixer 150 so as to be lower or equal to a predetermined temperature which is lower than the temperature of when carrying out the image forming (Step S108). The predetermined temperature is a temperature which can control negative influences such as curling of the sheets, deterioration of the image of the color sample and the like due to the heat of the fixing unit 150. The controlling of the temperature so as to be lower or equal to the predetermined temperature includes turning off of the heater which heats the fixer 150.

Next, the processor 110 determines whether starting of the calibrating operation of the colorimeter 220 is instructed (Step S109). The above starting instruction is made by a predetermined operation being carried out by a user on the operating unit 122 of the operating panel 120, for example.

When the processor 110 determines that the starting instruction is made (Step S109: YES), the processor 110 proceeds to Step S113.

On the other hand, when the processor 110 determines that the starting instruction is not made (Step S109: NO), the processor 110 determines whether the setting of the color sample carried out in Step S105 is canceled (Step S110).

When the processor 110 determines that the setting of the color sample is canceled (Step S110: YES), the processor 110 proceeds to Step S111.

On the other hand, when the processor 110 determines that the setting of the color sample is not canceled (Step S110: NO), the processor 110 proceeds to Step S109 and determines whether the starting of the calibrating operation of the colorimeter 220 is instructed again.

Next, the processor 110 allows reception of image forming jobs (Step S111). In such way, the image forming operation and the sheet passing operation in association with the image forming operation can be carried out.

Next, the processor 110 controls the setting temperature of the fixer 150 so as to be at the temperature of when carrying out the image forming (Step S112) and ends the process.

When the processor 110 determines that the starting of the calibrating operation of the colorimeter is instructed (Step S109: YES), the processor 110 makes the heating and conveying roller 151 of the fixer 150 separated from the fixing roller 152 (Step S113). In such way, the process of heating and pressuring the sheet (fixing process) will not to be carried out when passing the sheet (color sample) through the fixer 150.

Next, the processor 110 turns the flattener 160 off (Step S114). In such way, the process of flattening the sheet will not to be carried out when passing the sheet (color sample) through the flattener 160. This is because, since the fixing process is not carried out to the sheet which is to be passed through the flattener 160 in Step S114, the sheet is not deformed and there is no need to flatten the sheet.

Next, the processor 110 determines whether the setting temperature of the fixer 150 is lower or equal to the predetermined temperature (Step S115).

When the processor 110 determines that the setting temperature of the fixer 150 is lower or equal to the predetermined temperature (Step S115: YES), the processor 110 proceeds to Step S116.

On the other hand, when the processor 110 determines that the setting temperature of the fixer 150 is higher than the predetermined temperature (Step S115: NO), the processor 110 repeats the process of Step S115 until the processor 110 determines that the setting temperature of the fixer 150 is lower or equal to the predetermined temperature.

Next, the processor 110 sets the sheet conveying speed to the maximum speed, that is, to the fastest sheet conveying speed available in the image forming (Step S116). In such way, the sheet conveying time can be shorter comparing to when carrying out the image forming. The sheet conveyance speed can be set to a speed faster than the maximum speed available in the image forming.

Next, the processor 110 makes the sheet feeder 170 feed the color sample (sheet) and makes the sheet conveyor 180 convey the color sample which is fed (Step S117). In particular, the processor 110 makes the sheet feeding tray, among the sheet feeding trays T1 to T3 of the sheet feeder 170, for which the color sample is set (housed) in Step S105 feed the color sample and makes the sheet conveyor 180 convey the color sample which is fed.

Next, the processor 110 outputs the color sample with a transfer output value which is lower or equal to a predetermined value, the output value being the value of when carrying out the transfer by the transfer unit of the image former 140 (Step S118). The controlling of the output value so as to be lower or equal to the predetermined value includes turning off of the output at the time of transferring.

Next, the processor 110 makes the colorimeter 220 read the color sample and obtains the image data of the read image (Step S119).

Next, the processor 110 calibrates the output value of the colorimeter 220 on the basis of the image data obtained in Step S119 (Step S120).

Next, the processor 110 automatically cancels the setting of the color sample which is set in Step S105 (Step S121) and ends the process.

As described above, the image forming system 1 (image forming apparatus) according to the embodiment includes the sheet feeder 170 which houses and feeds sheets, the sheet conveyors 180 and 230 which convey the sheets which are fed from the sheet feeder 170, the image former 140 which forms an image on a sheet, the fixer 150 which fixes the image formed on the sheet by the image former 140, the colorimeter 220 which is provided on the down-stream side of the fixer 150 in the sheet conveying direction and which reads the image formed on the sheet, and the processor 110 which calibrates the colorimeter 220 on the basis of the image read by the colorimeter 220. Further, when the image for calibration which is formed in advance on the color sample which is housed in the sheet feeder 170 is to be read by the colorimeter 220, the processor 110 controls at least one of the sheet conveyors 180 and 230, the image former 140 and the fixer 150 according to the condition for controlling the deterioration of the color sample which is different from the condition of when carrying out the image forming.

Therefore, according to the image forming system 1 of the embodiment, changes in the surface condition of the color sample can be controlled without having a special mechanism when conveying the color sample. Thus, the colorimeter 220 is calibrated without requiring a special mechanism and without having a negative influence on the calibration. Further, by conveying the color sample according to the condition for controlling the deterioration of the color sample which is different from the condition of when carrying out the image forming, the deterioration of the color sample can be controlled in comparison with a case where the color sample is conveyed according to the condition of when carrying out the image forming. Thus, the color sample can be reused repeatedly.

Furthermore, according to the image forming system 1 of the embodiment, when the processor 110 makes the sheet conveyors 180 and 230 convey the color sample, the processor 110 determines whether the setting temperature of the fixer 150 is lower or equal to the predetermined temperature which is lower than the temperature of when carrying out the image forming. When the processor 110 determines that the setting temperature of the fixer 150 is lower or equal to the predetermined temperature, the color sample is passed through the fixer 150.

Therefore, according to the image forming system 1 of the embodiment, negative influences such as deforming of the color sample, deterioration of the image and the like due to the heat of the fixer 150 are controlled. Thus, the color sample can be reused repeatedly.

Moreover, according to the image forming system 1 of the embodiment, when the processor 110 makes the sheet conveyors 180 and 230 convey the color sample, the processor 110 makes the pair of rollers (the heating and conveying roller 151 and the fixing roller 152) of the fixer 150 separate from each other and makes the color sample pass between the pair of rollers.

Therefore, according to the image forming system 1 of the embodiment, negative influences such as deforming of the color sample, deterioration of the image and the like due to heating caused by the fixing process are further controlled. Thus, the color sample can be reused for a longer time.

Further, according to the image forming system 1 of the embodiment, the processor 110 determines whether the sheet length of the color sample in the sheet conveyance direction is longer or equal to the predetermined sheet length. When the processor 110 determines that the sheet length of the color sample is longer or equal to the predetermined sheet length, the sheet conveyors 180 and 230 convey the color sample.

Therefore, according to the image forming system 1 of the embodiment, a sheet can be conveyed even in the state where the heating and conveying roller 151 and the fixing roller 152 of the fixer 150 are separated from each other. Thus, mal-conveyance is controlled and the work efficiency is prevented from lowering.

The image forming system 1 according to the embodiment further includes the flattener 160 which is disposed between the fixer 150 and the colorimeter 220 and which corrects deformation of the sheets. When the processor 110 makes the sheet conveyors 180 and 230 convey the color sample, the processor 110 further turns the corrector 160 off and then makes the color sample pass through the flattener 160.

Therefore, according to the image forming system 1 of the embodiment, negative influences on the color sample due to pressuring and the like caused by the flattening process are controlled. Thus, the color sample can be reused repeatedly.

Furthermore, according to the image forming system 1 of the embodiment, when the PI tray is provided and the color sample is selected as the paper type of the sheets housed in any one sheet feeding tray among the sheet feeding trays T1 to T3 of the sheet feeder 170, the processor 110 makes the display 121 display a warning to use the PI tray.

Therefore, according to the image forming system 1 of the embodiment, when the PI tray is provided, the color sample is conveyed from the PI tray which is close to the colorimeter 220. Thus, the conveying time of the color sample (the time in which the color sample is in sliding contact with the conveying guide) is shortened and damage to the color sample during conveyance is controlled. Further, since the merging position of the color sample from the PI tray into the conveying path is at the down-stream side than the fixer 150, negative influences due to the heat of the fixer 150 are controlled. Thus, the color sample can be reused for a longer time.

Furthermore, according to the image forming system 1 of the embodiment, in the case where the color sample is set as the paper type of the sheets housed in any of the sheet feeding trays T1 to T3 of the sheet feeder 170, the processor 110 stops receiving image forming jobs and only carries out the sheet passing operation of the color sample.

Therefore, according to the image forming system 1 of the embodiment, since the normal operation including the image forming operation is not carried out continuously, a sufficient time is guaranteed for switching to the normal operation from the calibrating operation. Thus, malfunction such as the fixing process being carried out before the temperature of the fixer 150 is heated sufficiently and the like is controlled.

Moreover, according to the image forming system 1 of the embodiment, when the color sample is set as the paper type of the sheets housed in any of the sheet feeding trays T1 to T3 of the sheet feeder 170, the processor 110 controls the setting temperature of the fixer 150 so as to be lower or equal to the predetermined temperature which is lower than the temperature of when carrying out the image forming.

Therefore, according to the image forming system 1 of the embodiment, the temperature controlling of the fixer 150 is switched when any of the sheet feeding trays T1 to T3 is set to the color sample without waiting for the instruction from a user to start the calibrating operation. Thus, the time required for the setting temperature of the fixer 150 to be lower or equal to the predetermined temperature is shortened.

Further, according to the image forming system 1 of the embodiment, when the color sample is conveyed by the sheet conveyors 180 and 230, the processor 110 makes the sheet conveyors 180 and 230 convey the color sample at a speed faster than or equal to the fastest sheet conveying speed available in the image forming.

Therefore, according to the image forming system 1 of the embodiment, the time required for conveying the color sample is shortened as much as possible. Thus, the work efficiency is improved by shortening the time required for calibration.

Furthermore, according to the image forming system 1 of the embodiment, after the colorimeter 220 is calibrated on the basis of the image for calibration which is read by the colorimeter 220, the processor 110 automatically cancels the setting that the paper type of the sheets housed in any of the sheet feeding trays T1 to T3 of the sheet feeder 170 is the color sample.

Therefore, according to the image forming system 1 of the embodiment, the warming-up operation of the fixer 150 and the like is carried out by canceling the setting when the calibrating operation ends without waiting for the instruction from a user. Thus, the time required until the normal image forming is to be carried out again is shortened and the waiting time of a user is shortened as much as possible.

In the above, the embodiment of the present invention is specifically described. However, the present invention is not limited to the above described embodiment and can be modified within the scope of the invention.

For example, in the above embodiment, an example where the color sample is passed through the fixer 150 when it is conveyed by the sheet conveyors 180 and 230 is described. However, this is not limitative in any way. For example, in a case where there is a detour path 195 that avoids the fixer 150, the color sample can be conveyed on this detour path.

Further, in a case where two fixers 150 are provided and where there is a detour path 195 which avoids one of the fixers 150, the color sample may be conveyed on this detour path that avoids one of the fixers 150. For example, in a case where there is a detour path 195 that avoids the fixer 150 which is disposed on the down-stream side in the conveying path, the color sample may be conveyed on this detour path.

As described above, in the case where there is a detour path that avoids the fixer 150, there is no need to control the fixer 150 according to a condition different from the condition of when carrying out the image forming since the color sample is conveyed on the detour path. Thus, the controlling is easy and the work efficiency is improved. Further, since negative influences due to the heat of the fixer 150 are reduced, the color sample can be reused for a longer time.

Further, in the above embodiment, the sheet conveying speed is set to a speed faster than or equal to the maximum speed available in the image forming (see Step S116 in FIG. 4). However, this is not limitative in any way. For example, it can be controlled so as to convey the color sample at the maximum speed when conveying it though the image forming apparatus main body 100 and convey the color sample at a slower conveying speed while the image for calibration is read by the colorimeter 220 in the finish apparatus 200.

In such way, by reducing the conveying speed of the color sample while the image is read, the reading accuracy is guaranteed.

In a case where setting of the color sample (see Step S105 in FIG. 3) is carried out while the power is turned on or during the warming-up operation for recovering from the shut down state, the warming-up operation may be stopped and the calibrating operation of the colorimeter 220 may be executed.

In such way, by stopping the warming-up operation and executing the calibrating operation of the colorimeter 220, the setting temperature of the fixer 150 is easily set to the predetermined temperature or lower and the work efficiency is improved.

Further, in the embodiment, when the color sample is selected as the paper type of the sheets which are housed in any one of the sheet feeding trays T1 to T3 in the sheet setting window G1, the image forming apparatus main body 100 switches to the calibrating operation mode to execute the calibrating operation of the colorimeter 220. However, this is not limitative in any way. For example, instead of requesting a predetermined operation to be carried out on the sheet setting window G1, a button for switching to the calibrating operation mode may be provided on the operating panel 120.

Further, for example, by using a color sample on which an image is formed by another image forming apparatus as the color sample instead of the color sample on which the predetermined image for calibration is printed in advance, colors can be made to match the colors of the other image forming apparatus.

Further, in the above embodiment, the processor 110 of the image forming apparatus main body 100 controls units of the image forming apparatus main body 100, and the processor 210 of the finish apparatus 200 controls units of the finish apparatus 200. However, this is not limitative in any way. For example, the processor 110 of the image forming apparatus main body 100 may control units of the finish apparatus 200 in addition to units of the image forming apparatus main body 100. That is, the processor 110 of the image forming apparatus main body 100 may also function as the processor of the finish apparatus 200.

In addition, with respect to the detail configuration of the individual apparatus that forms the image forming system and the detail operation of the individual apparatus, they can be modified as needed within the scope of the invention.

What is claimed is:
1. An image forming apparatus comprising,
a sheet feeder which houses and feeds a sheet;
a sheet conveyor which conveys the sheet fed from the sheet feeder;
an image former which forms an image on the sheet;
a fixer which fixes the image formed on the sheet by the image former;
a colorimeter which is provided on a down-stream side of the fixer in a sheet conveying direction and which reads the image formed on the sheet; and
a processor which calibrates the colorimeter based on an image for calibration read by the colorimeter, the processor controlling at least one of the sheet conveyor, the image former and the fixer according to a condition for controlling deterioration of a color sample housed in the sheet feeder when the image for calibration, which is formed in advance on the color sample housed in the sheet feeder, is made to be read by the colorimeter, the condition being different from a condition for carrying out an image forming process;
wherein, when the processor makes the sheet conveyor convey the color sample, the processor makes a pair of rollers of the fixer separate from each other and makes the color sample pass through the pair of rollers;
wherein, the processor determines whether a sheet length of the color sample in the sheet conveyance direction is longer or equal to a predetermined sheet length, which allows the color sample to be in contact with a conveying roller in front of the fixer and a conveying roller behind the fixer; and wherein, when the processor determines that the sheet length of the color sample is longer or equal to the predetermined sheet length, the processor makes the sheet conveyor convey the color sample, and wherein when the processor determines that the sheet length of the color sample is less than the predetermined sheet length, the processor displays a warning to use a sheet whose length is longer or equal to the predetermined sheet length.

2. The image forming apparatus of claim 1, wherein, when the processor makes the sheet conveyor convey the color sample, the processor determines whether a setting temperature of the fixer is lower or equal to a predetermined temperature which is lower than a temperature of when carrying out the image forming process, and wherein, when the processor determines that the setting temperature of the fixer is lower or equal to the predetermined temperature, the processor makes the color sample pass through the fixer.

3. The image forming apparatus of claim 1, further comprising:

a flattener which is disposed between the fixer and the colorimeter and which corrects deformation of the sheet, wherein, when the color sample is conveyed by the sheet conveyor, the processor makes the color sample pass through the flattener after turning the flattener off.

4. The image forming apparatus of claim 1, further comprising:

a detour path which avoids the fixer, wherein, when the color sample is conveyed by the sheet conveyor, the processor makes the color sample be conveyed on the detour path which avoids the fixer.

5. The image forming apparatus of claim 1, wherein, when the color sample is set as a paper type of sheets housed in a sheet feeding tray of the sheet feeder, the processor stops receiving an image forming job and only carries out a passing operation of the color sample.

6. The image forming apparatus of claim 1, wherein, when the color sample is set as a paper type of sheets housed in a sheet feeding tray of the sheet feeder, the processor controls a setting temperature of the fixer so as to be lower or equal to a predetermined temperature which is lower than a temperature of when carrying out the image forming process.

7. The image forming apparatus of claim 1, wherein, when the color sample is conveyed by the sheet conveyor, the processor makes the color sample be conveyed at a speed faster than or equal to a fastest conveying speed available in the image forming process.

8. The image forming apparatus of claim 1, wherein the processor automatically cancels a setting that a paper type of sheets housed in a sheet feeding tray of the sheet feeder is the color sample after the colorimeter is calibrated based on the image for calibration which is read by the colorimeter.

9. An image forming apparatus comprising:

a sheet feeder which houses and feeds a sheet;
a sheet conveyor which conveys the sheet fed from the sheet feeder;
an image former which forms an image on the sheet;
a fixer which fixes the image formed on the sheet by the image former;
a colorimeter which is provided on a down-stream side of the fixer in a sheet conveying direction and which reads the image formed on the sheet; and
a processor which calibrates the colorimeter based on an image for calibration read by the colorimeter, the processor controlling at least one of the sheet conveyor, the image former and the fixer according to a condition for controlling deterioration of a color sample housed in the sheet feeder when the image for calibration, which is formed in advance on the color sample housed in the sheet feeder, is made to be read by the colorimeter, the condition being different from a condition for carrying out an image forming process;
a PI tray for insert sheets, which is provided in a finish apparatus,
wherein, when the color sample is selected as a paper type of sheets housed in a sheet feeding tray of the sheet feeder, the processor makes a display a warning to use the PI tray.

10. The image forming apparatus of claim 9, wherein, when the color sample is set as a paper type of sheets housed in a sheet feeding tray of the sheet feeder, the processor stops receiving an image forming job and only carries out a passing operation of the color sample.

11. An image forming method of an image forming apparatus comprising a sheet feeder which houses and feeds a sheet, a sheet conveyor which conveys the sheet fed from the sheet feeder, an image former which forms an image on the sheet, a fixer which fixes the image formed on the sheet by the image former, a processor controlling at least one of the sheet conveyor, the image former and the fixer according to a condition for controlling deterioration of a color sample housed in the sheet feeder, and a colorimeter which is provided on a down-stream side of the fixer in a conveying direction and which reads the image formed on the sheet, the method comprising:

calibrating the colorimeter based on an image for calibration read by the colorimeter, wherein in the calibrating, when the colorimeter reads the image for calibration, which is formed in advance on the color sample, at least one of the sheet conveyor, the image former and the fixer is controlled according to a condition for controlling deterioration of the color sample which is different from a condition for carrying out an image forming process;

wherein, when the processor makes the sheet conveyor convey the color sample, the processor makes a pair of rollers of the fixer separate from each other and makes the color sample pass through the pair of rollers;

wherein, the processor determines whether a sheet length of the color sample in the sheet conveyance direction is longer or equal to a predetermined sheet length, which allows the color sample to be in contact with a conveying roller in front of the fixer and a conveying roller behind the fixer, and wherein, when the processor determines that the sheet length of the color sample is longer or equal to the predetermined sheet length, the processor makes the sheet conveyor convey the color sample, and wherein when the processor determines that the sheet length of the color sample is less than the predetermined sheet length, the processor displays a warning to use a sheet whose length is longer or equal to the predetermined sheet length.

12. A non-transitory computer readable medium having a program stored thereon for controlling a computer of an image forming apparatus comprising a sheet feeder which houses and feeds a sheet, a sheet conveyor which conveys the sheet fed from the sheet feeder, an image former which forms an image on the sheet, a fixer which fixes the image formed on the sheet by the image former, and a colorimeter which is provided on a down-stream side of the fixer in a conveying direction and which reads the image formed on the sheet, the program, when being executed by a processor of the computer of the image forming apparatus, causing the processor to perform a process comprising:

calibrating the colorimeter based on an image for calibration read by the colorimeter, and when the colorimeter reads the image for calibration, which is formed in advance on a color sample, controlling at least one of the sheet conveyor, the image former and the fixer according to a condition for controlling deterioration of the color sample which is different from a condition for carrying out an image forming process;

wherein, when the processor makes the sheet conveyor convey the color sample, the processor makes a pair of rollers of the fixer separate from each other and makes the color sample pass through the pair of rollers;

wherein, the processor determines whether a sheet length of the color sample in the sheet conveyance direction is longer or equal to a predetermined sheet length, which allows the color sample to be in contact with a conveying roller in front of the fixer and a conveying roller behind the fixer, and wherein, when the processor determines that the sheet length of the color sample is longer or equal to the predetermined sheet length, the processor makes the sheet conveyor convey the color sample, and wherein when the processor determines that the sheet length of the color sample is less than the predetermined sheet length, the processor displays a warning to use a sheet whose length is longer or equal to the predetermined sheet length.

\* \* \* \* \*